Patented Oct. 10, 1950

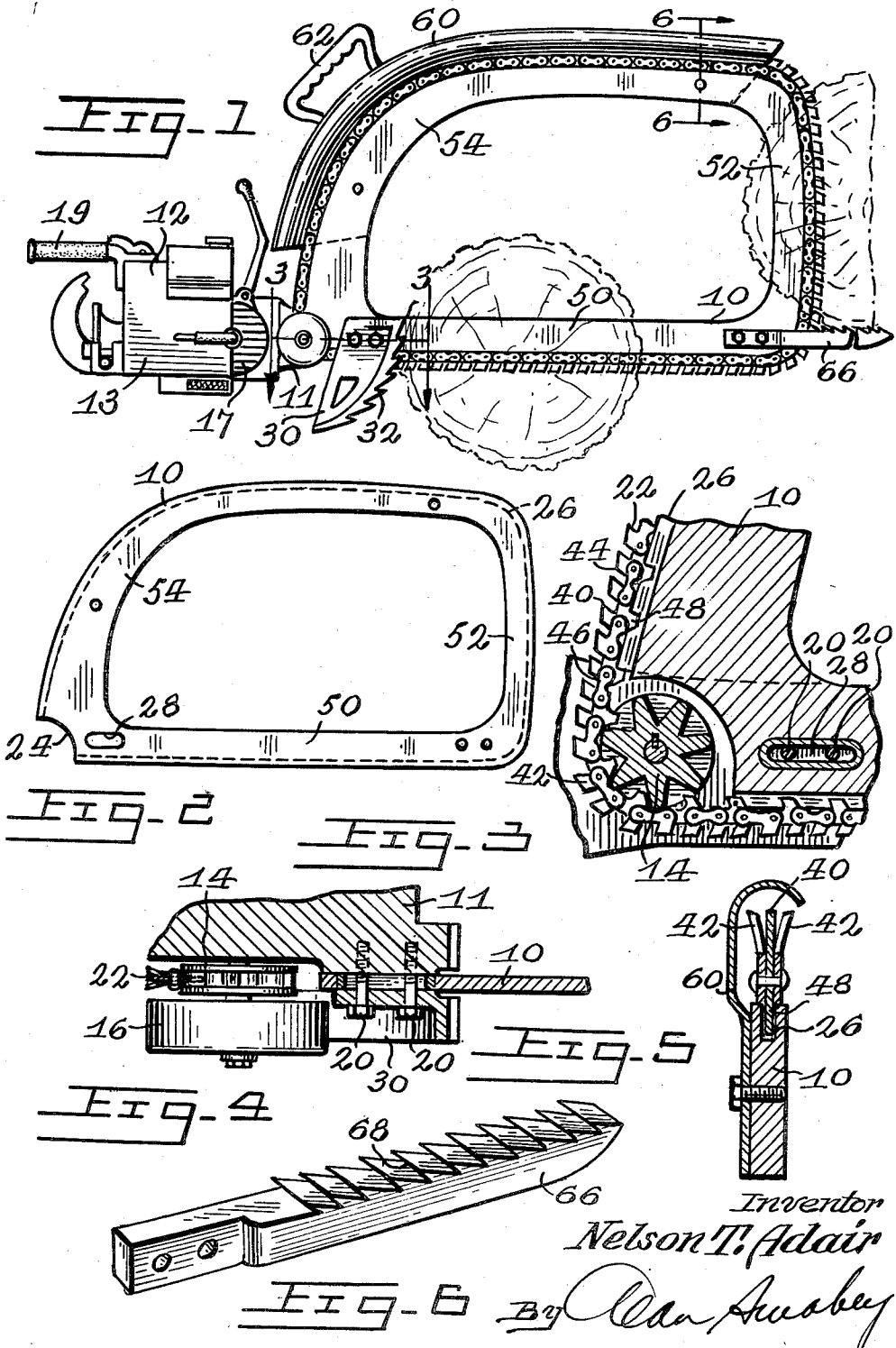

2,525,110

UNITED STATES PATENT OFFICE 2,525,110

CHAIN SUPPORTING FRAME FOR PORTABLE CHAIN SAWS

Nelson T. Adair, Montreal, Quebec, Canada

Application May 26, 1949, Serial No. 95,514

1 Claim. (Cl. 143—32)

Introduction

The present invention relates to portable power driven chain saws and more particularly to improvements in saws of this nature as employed for felling and cutting timber.

There are available, at the present time, many and varied types of portable saws that employ an endless cutting chain supported on a saw frame and driven by a portable power source, for example, a light internal combustion motor. The design and construction of the saw frames that support the cutting chain in saws of this nature are a main factor in their practical use, particularly in the type of saw intended for use by a single operator. Most of the prior apparatus of this nature has been made either as having elongated saw frames that support the chain in a manner especially suited for felling or as having bow-shaped frames that support the chain so as to provide a single cutting edge. In practical use in the woods, the elongated type of saw frame is rather unwieldy to be handled by one man and the bow-shaped type, while more generally portable than the double edged variety, still does not fill the desired need for a practical versatile power driven saw that can be used by one man as easily as the bucksaws and axes formerly employed.

The present invention aims to provide a novel saw frame construction, adapted for attachment to standard portable chain saw power sources, that is designed so as to support an endless cutting chain in a manner that reduces the weight and bulkiness of a saw of this nature so that it may be easily handled by one man. Moreover, the present saw frame construction supports the cutting chain so as to provide more than one cutting edge. This adds greatly to the versatility of the appliance, allowing it to be used for felling, notching, sawing, or trimming of trees or logs.

Applicant's development

Accordingly, the invention is a saw frame adapted for attachment to, and to be used in combination with, a portable chain saw having a driving power section and an endless cutting chain driven by the power section. The preferred construction of the saw frame according to the invention includes a groove about the outer periphery so as to provide a guiding track for the travel of the cutting chain, the frame being shaped so as to guide the chain in a first straight run cutting portion substantially the length of the frame and a second straight run cutting portion at right angles to the first cutting run portion with an arcuate return run portion joining the first and second cutting run portions. Means are provided for the attaching of the frame to the power source of the saw, and guard means are provided in the saw frame to enclose the cutting chain on the return run portion.

Notched tree engaging members are secured to and project from the frame at the end of each of the straight cutting run portions so that the frame and chain is held in cutting engagement with a log or tree when the cutting portions are in use.

Detailed description

Having thus generally described the nature of the invention, particular reference will be made to the accompanying drawings, and in which:

Figure 1 is a view in side elevation of a portable chain saw embodying a preferred construction of a saw frame according to the invention.

Figure 2 is a view in side elevation of the saw frame removed from the saw.

Figure 3 is a sectional view of a portion of Figure 1 along the lines 3—3 to illustrate the arrangement of the driving spur wheel and the saw frame.

Figure 4 is a detail view in plan elevation of the attachment of the saw frame to the power source, corresponding in location to the section of Figure 3.

Figure 5 is a sectional view of a portion of Figure 1 along the lines 5—5, illustrating in more detail the arrangement of the chain and chain guard.

Figure 6 is an enlarged detail view of the tree engaging member.

With particular reference to Figure 1 of the drawings, a preferred form of a saw frame constructed according to the invention is illustrated as being attached to a chain saw power unit 12. The power unit 12 includes a main frame 11 on which is mounted an internal combustion engine 13, having a control lever 15 and a power take off 17 from which the endless chain is driven. A handle 19 is provided at the rear of the frame 11 so as to provide a means for supporting and guiding the saw.

The power take off 17 includes a driving gear 14 driven from a friction clutch 16 and the frame 10 is mounted on a portion of the frame 11 of the power unit 12 by bolts 20 so as to support the endless cutting chain 22 as it is driven by the gear 14. The frame 10 includes an arcuate cut out 24 to accommodate the gear 14 and is formed so as to have a groove 26 extending completely about the outer periphery so as to provide a guiding track for the run of the chain 22. An elongated slot 28 is provided in the frame 10 and the bolts 22 pass through this slot and into the frame portion 11 so as to provide a means of adjusting the tension of the chain 22.

A tree engaging member 30 is also secured in position by the bolts 22 and is arranged so that the end of the saw frame 10 is secured between the member 30 and the frame 11 of the power unit 12 as is shown in Figure 4. The member 30 is made as having an arcuate notched face 32 that extends outwardly from the saw frame 10 and it is this face that is adapted to retain the saw in cutting engagement with a tree or log.

The form of cutting chain illustrated in the present arrangement comprises a series of linked alternately disposed raker teeth 40 and cutting teeth 42 that are connected by links 44, and alternate link portions 46 that extend from the cutting teeth 42. The raker teeth 40 include a portion 48 that extends below the link members and it is the tooth portions 48 that engage with and are driven by the driving gear 14 and ride in the groove 26 of the saw frame so as to guide the run of the chain 22.

Preferably, the frame 10 is made of a single piece of high grade steel similar to that used in the manufacture of saw blades and the groove 26 is cut deeper than the guiding portion 48 of the raker teeth 40. When the endless chain 22 is in operation the links connecting the chain 22 bear on the outer surface of the frame 10 at each side of the groove 26 with the tooth portions 48 riding clear of the bottom of the groove. With this arrangement any heat that may be caused by frictional bearing between the chain 22 and the frame 10 is confined to the outer edges of the frame 10 where it is completely exposed so as to provide the maximum of cooling area.

The frame 10 is shaped so as to guide the chain 22 in a first straight cutting run portion 50 and a second straight cutting run portion 52 that extends substantially at right angles to the first run portion. The non-cutting return run portion 54 of the frame is of arcuate form so as to provide the maximum of clearance to the cutting stroke of the saw. A guard member 60 is bolted to the saw frame 10 so as to cover the chain 22 as it passes over the rear run portion 54 of the frame and a handle 62 is provided on the guard so as to facilitate handling of the saw.

A second tree engaging member 66 having a notched inner face 68 is secured to the frame 10 so that it projects outwardly therefrom at the end of the second straight cutting run portion 52 so as to retain the saw frame in cutting engagement with a log or tree when the chain guided by the second chain guiding portion 52 is employed.

The particular arrangement of the second chain guiding portion 52 and the tree engaging member 66 give the present saw frame construction certain advantages not found in prior art structures of this nature. The provision of a second cutting edge disposed at substantially right angles to the usual cutting edge extending outwardly from the power source allows the tool to be used in a manner particularly suited for the cutting and trimming of small trees as in pulpwood timber. For example, the operator can take a position in front of a small tree and by placing the member 66 at the side of the tree, while supporting the weight of the saw by the handles 19, and 62, can quickly and easily perform the felling operation by guiding the saw around in a semi-circular motion using the member 66 as a fulcrum, the cutting run of the chain 22 guided by the frame portion 52 being such that the drag of the chain 22 forces the member 66 into close contact with the outer surface of the tree.

Due to the elimination of idler wheels and the like for the guiding of the saw chain the frame 10 at any point about the run of the chain 22 is narrower in cross section than the width of the kerf cut by the cutting teeth 42. This allows the frame to pass freely through a log or tree and eliminates the necessity of wedging so as to prevent jamming of the frame. Further, the absence of projecting parts about the frame allows the saw to be used close to the ground reducing stumpage to the minimum.

I claim:

A saw frame adapted for attachment to a portable chain saw having a driving power section and an endless cutting chain driven by said power section, said saw frame including a groove about the outer periphery constituting a guiding track for the travel of said cutting chain, and being shaped so as to have a first straight-cutting run chain guiding portion substantially the length of the frame, a second straight-cutting run chain guiding portion at right angles to said first guiding portion, and an arcuate return run chain guiding portion joining the first and second chain guiding portions, guard means secured to said frame to enclose at least one side and the top of said cutting chain travelling in said return run portion, and tree engaging members secured to and projecting from said frame at the end of each of said first and second chain guiding portions whereby the saw frame is held in cutting relationship with a tree or log when either of said first and second cutting chain guide portions are in use.

NELSON T. ADAIR.

REFERENCES CITED

The following references are of record in the file of this patent:

UNITED STATES PATENTS

| Number | Name | Date |
|---|---|---|
| 834,251 | Bailey | Oct. 30, 1906 |
| 1,061,702 | Taggart | May 13, 1913 |
| 1,601,201 | Daw | Sept. 28, 1926 |

FOREIGN PATENTS

| Number | Country | Date |
|---|---|---|
| 61,476 | Norway | Oct. 2, 1939 |